United States Patent
Hardin et al.

(10) Patent No.: US 11,574,224 B2
(45) Date of Patent: Feb. 7, 2023

(54) FACILITATION OF PREDICTIVE INTERNET-OF-THINGS DEVICE IDENTIFICATION

(71) Applicant: AT&T Mobility II LLC, Atlanta, GA (US)

(72) Inventors: Stephen T. Hardin, Suwanee, GA (US); Johnathan Webb, Katy, TX (US); Jordan Alexander, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 611 days.

(21) Appl. No.: 16/596,203

(22) Filed: Oct. 8, 2019

(65) Prior Publication Data

US 2021/0103842 A1    Apr. 8, 2021

(51) Int. Cl.
*H04W 12/76*    (2021.01)
*G06N 7/00*    (2023.01)
*H04W 12/71*    (2021.01)

(52) U.S. Cl.
CPC ............ *G06N 7/005* (2013.01); *H04W 12/71* (2021.01); *H04W 12/76* (2021.01)

(58) Field of Classification Search
CPC ....... H04W 12/71; H04W 12/76; G06N 7/005
USPC .......................................................... 706/12
See application file for complete search history.

(56) References Cited

U.S. PATENT DOCUMENTS

| 10,437,581 | B1* | 10/2019 | Patil ..................... G06F 8/71 |
| 11,115,823 | B1* | 9/2021 | Heiland ................ H04L 41/28 |
| 11,290,537 | B1* | 3/2022 | Argenti ................ H04L 67/16 |
| 2011/0292923 | A1* | 12/2011 | Noldus ............... H04Q 3/0025 370/338 |
| 2017/0180380 | A1* | 6/2017 | Bagasra ............... H04L 63/101 |
| 2020/0404501 | A1* | 12/2020 | Kang ................... H04W 8/205 |

* cited by examiner

*Primary Examiner* — Josnel Jeudy
(74) *Attorney, Agent, or Firm* — Amin, Turocy & Watson, LLP

(57) ABSTRACT

Internet-of-things (IOT) devices can be identified based on specific behavioral patterns when their identification data is unknown. Previously identified IOT devices with similar behavioral patterns can be used as a baseline from which to compare data that is available about unknown IOT devices. For example, an IOT device can be pooled with a group of IOT devices based on the frequency with which they connect to a wireless network. Additionally, a confidence level of the unknown device being associated with the group of IOT devices can be generated based on such comparison data.

20 Claims, 10 Drawing Sheets

FACILITATION OF PREDICTIVE INTERNET-OF-THINGS DEVICE IDENTIFICATION

TECHNICAL FIELD

This disclosure relates generally to facilitating predictions of internet-of-things device identities. For example, this disclosure relates to facilitating internet-of-things device identities based on predictive behaviors for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to predictions of internet-of-things device identities is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
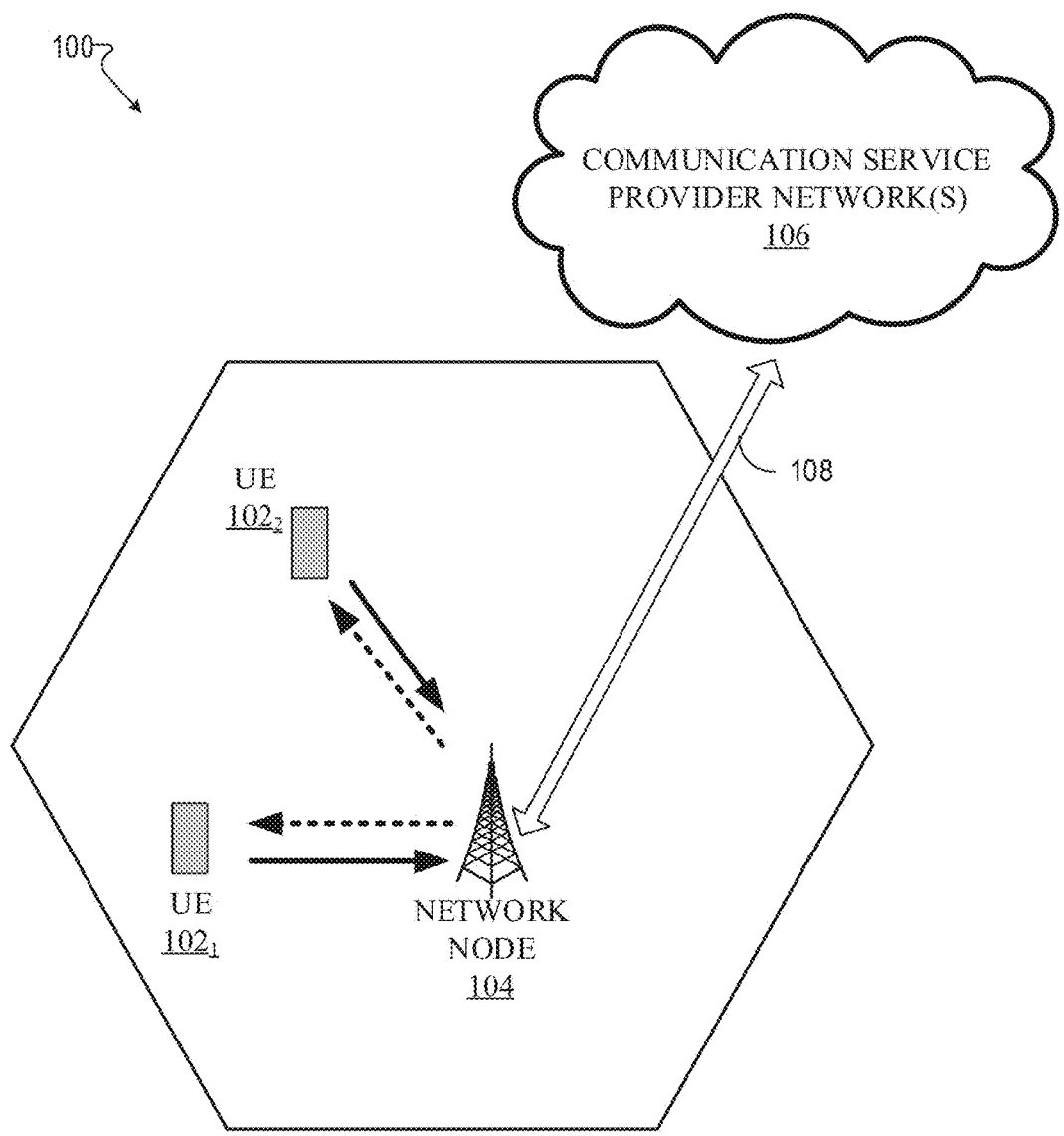
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate predictions of internet-of-things device identities for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), low-power wide area networks, (LPWAN), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate predictions of internet-of-things device identities for a 5G network. Facilitating predictions of internet-of-things device identities for a 5G network can be implemented in connection with any type of device with a connection to the communications network (e.g., a mobile handset, a computer, a handheld device, etc.). Any Internet of things (IOT) device (e.g., toaster, coffee maker, blinds, music player, speaker, alarm, alarm panel, asset tracking, automated teller machine (ATM), camera, connected button, drone, ebook reader, emergency phone, express card, field service terminal, gaming device, gateway, gateway-vehicle, GPS smart antenna, handheld terminal, home detention, hotspot, medical telematics, meter (e.g., gas, oil & gas, parking, power, water), modem (e.g., serial, socket USB), module (e.g., ball grid array (BGA), half mini express peripheral component interconnect (PCIe), leadless chip carrier (LCC), land grid array (LGA), M.2, PCIe, LCC, LGA, M.2, PCIe, proprietary), mPERS, netbook, onboard diagnostics (OBD) II, parking citation dispenser, personal navigation device (PND), point of sale, POTS, power fault alarm, remote control device, remote monitoring device, router, rugged handheld, secure mobile environment (SME) personal electronic device (PED), tablet, telematics control unit, tracking device, vehicle mounted handset, vending telemetry, voice & data modem, wearable, wireless picture frame, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system.

Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

When device manufactures utilized the same international mobile equipment identity (IMEI) type allocation code (TAC) (e.g., the first 8 digits of a 15 digit IMEI), it can be difficult to determine the identity of the device one it has accessed the network. For instance, when end device manufacturers use a common component from a supplier in the same way with no regard that the serialization of the radio is associated with the embedded module and not the integrated device, once two or more integrated devices use the same module serial TAC value, then they cannot be distinguished apart from one another without a physical inspection method today. Although internet-of-things (IOT) devices typically comprise a radio to provide connectivity, their main purpose is generally for something else (e.g., a camera, a tracker, a sensor, etc.). The first 8 digits can indicate the module, however multiple different devices can be certified with that module. Thus, methods can be used to identify what the devices are.

For example, a certain number of devices can be known. Thus, if there is activity that is associated with known devices, then that activity or a similar activity can be associated with or correlate to similar type devices. Network data, customer data, serial codes, and/or IMEI data can be used to build assumptions that unknown devices can correlate to known devices. A TAC database can identify which device a TAC belongs to. The TAC database can receive data from a GSMS database, a personal communication service (PCS) type certification review board (PTCRB), and/or other sources. A module based device IMEI database (MDID) can also receive data from various servers including, but not limited to, a lightweight mobile to mobile (LWM2M) server, subscriber identity module (SIM) servers, etc.

The current disclosure can comprise a master aggregation IMEI database (MAID). The MAID can aggregate IOT device data from various sources (e.g., TAC database, MDID, IMEI database, DARS, etc.). The MAID can also receive a request for data related to the identification of an IOT device. For example, the MAID can receive a query for a discrete IMEI value, and in response to that query, the MAID can send the full identity and all attributes (e.g., certification record, model, name, date of certification, etc.) associated with the queried device. However, if there is no record of the queried device, but the session data can associated devices for which the types of devices are known, then the type of device (e.g., model number, firmware version, etc.) can be estimated to within a degree of certainty. For example, if the IMEI is known, then that could provide date on the international mobile subscriber identity (IMSI), which can then lead to data on an access point network (APN) can lead to tracking of other device activity/behavior (e.g., sessions, time of sessions, etc.) that use the APN. Control plane data can tell how often a device is interacting with the network (e.g., frequency of connection, location, signal strength, switch identification for a session, cell identification for a session, mobility (is the device moving or stationary), duration of connection, abnormalities in behavior, etc.). Thus, based on the activity/behavior of a group of known IOT devices, a confidence level can be generated that is representative of whether an unknown IOT device should fall within the group of known IOT devices. In an alternative embodiment, the MAID can respond to the query with several potential groups of IOT devices, for which the queried IOT device could be, and/or an associated confidence level for each. Additionally, the MAID can present time-based data. For instance, currently the MAID might only be able to predict to within a 70% confidence that the queried device belongs to a certain group. However, after acquiring additional data points on known IOT devices, the MAID predictions can change (e.g., increase or decrease) based on the additional data points. The MAID can also predict when it might have the additional data points to improve the confidence level. For example, if the MAID recognizes that it collects one thousand new data points of known IOT devices per month, in response to the query, the MAID can indicate that although currently the confidence level is at 70%, in a month's time, the MAIDs confidence level can be at 90% if the one-thousand additional values are enough to increase the confidence level by 20%. Thus, the process can comprise labeling and/or assigning the confidence values to unknown IOT devices and/or labeling and/or assigning the unknown IOT devices to a pool of known IOT devices.

Device analytics and reporting server (DARS) is a reporting server that can be a feed for the network data that can host scorecard data associated with IOT devices. For example, the IOT devices can be ranked and/or separated by category (e.g., poor performing device, consistent reporting device, accurate reporting device, call detail records, etc.) or vertical device types. It should also be noted that the analysis and grouping functionality can sit at the MAID, the DARS, and/or a combination of both.

It should also be noted that an artificial intelligence (AI) component can facilitate automating one or more features in accordance with the disclosed aspects. A memory and a processor as well as other components can include functionality with regard to the figures. The disclosed aspects in connection with identifying one or more IOT devices can employ various AI-based (e.g., machine learning) schemes for carrying out various aspects thereof. For example, a process for detecting one or more trigger events, identifying an IOT device as a result of the one or more trigger events, and modifying one or more reported confidence measurements, and so forth, can be facilitated with an example automatic classifier system and process. In another example, a process for penalizing one identity pool while preferring another identity pool can be facilitated with the example automatic classifier system and process.

An example classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that can be automatically performed. In the case of communication systems, for example, attributes can be an IMEI and a TAC and the classes can be a type of IOT device. In another example, the attributes can be a location, a technology, and frequency of connecting to a wireless network and the classes can be a type of IOT device.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to grouping IOT devices, modifying a reported confidence measurement associated with the IOT device, and so forth. The criteria can include, but is not limited to, predefined values, frequency attenuation tables or other parameters, service provider preferences and/or policies, and so on.

In one embodiment, described herein is a method comprising aggregating, by a wireless network device comprising a processor, type allocation code data representative of a type allocation code and international mobile equipment identity data representative of an international mobile equipment identity of a first Internet-of-things device, resulting in aggregated data. Based on the aggregated data, the method can comprise analyzing, by the wireless network device, a pattern associated with the first internet-of-things device to determine a first behavior of the first Internet-of-things device. Additionally, the method can comprise receiving, by the wireless network device, behavior data representative of a second behavior of a second internet-of-things device. In response to the receiving the behavior data, the method can comprise comparing, by the wireless network device, the behavior data to the aggregated data to determine an identity associated with the second internet-of-things device.

According to another embodiment, a system can facilitate combining type allocation code data representative of a type allocation code and international mobile equipment identity data representative of an international mobile equipment identity of a first internet-of-things device of internet-of-things devices, resulting in combined data. Based on the combined data, the system can facilitate analyzing a pattern associated with the first internet-of-things device to determine a first behavior of the first internet-of-things device. Additionally, based on the behavior of the first of internet-of-things device, the system operations can comprise grouping the first of internet-of-things device with a group of the of internet-of-things devices. The system operations can comprise receiving behavior data representative of a second behavior of a second internet-of-things device of the internet-of-things devices. Furthermore, in response to the receiving the behavior data, the system operations can comprise comparing the behavior data to the combined data to determine an identity associated with the second internet-of-things device.

According to yet another embodiment, described herein is a machine-readable storage medium that can perform the operations comprising aggregating type allocation code data representative of type allocation codes and international mobile equipment identity data representative of international mobile equipment identities of internet-of-things devices, resulting in aggregated data. Based on the aggregated data, the machine-readable storage medium can perform the operations comprising analyzing a pattern associated with the internet-of-things devices to determine first behavior data representative of a first behavior of the internet-of-things devices. Additionally, the machine-readable storage medium can perform the operations comprising receiving second behavior data representative of a second behavior of an internet-of-things device that is not of the internet-of-things device. In response to the receiving the second behavior data, the machine-readable storage medium can perform the operations comprising comparing the second behavior data to the first behavior data, resulting in comparison data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T/1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5 G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
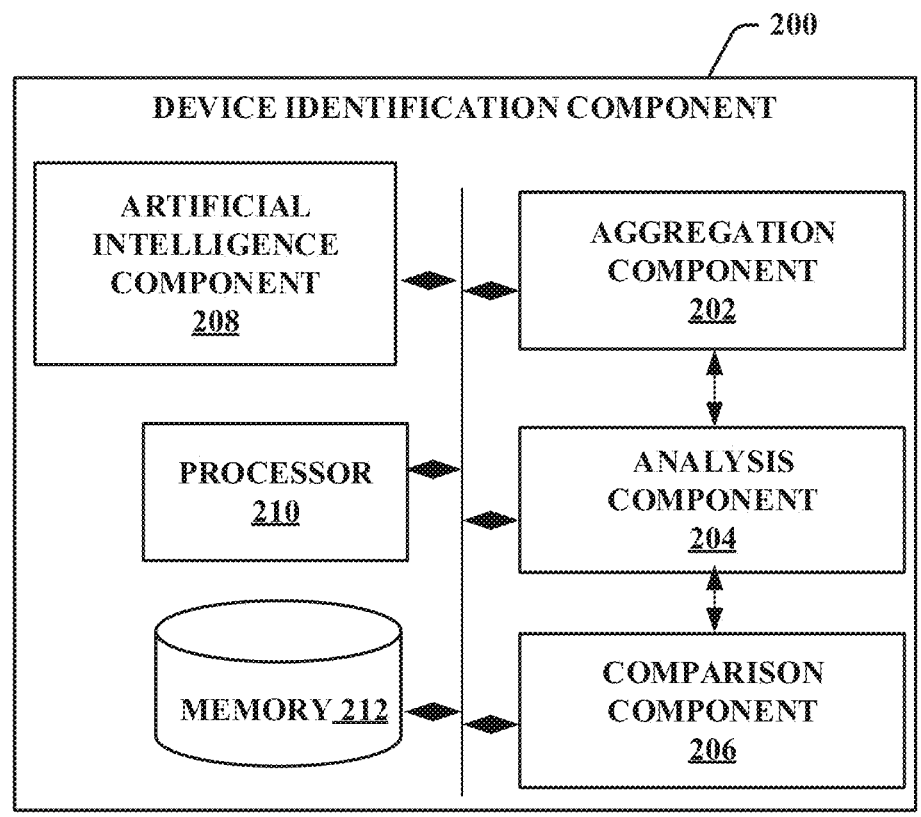
FIG. 2 illustrates an example schematic system block diagram of an example schematic system block diagram of a device identification component according to one or more embodiments.

Referring now to FIG. 2, illustrated is an example schematic system block diagram of a device identification component 200. The device identification component can be located at the network node 104, or it can be remote to the network node 104. The device identification component can also comprise a database for storing TAC data, IMEI data, IMSI, data, and/or any data associated with the identification of IOT devices. The device identification component 200 can comprise an aggregation component 202, an analysis component 204, a comparison component 206, an artificial intelligence component 208, a memory 212, and a processor 210, which can all be communicatively coupled. The processor 210 can correspond to a processing component from a plurality of processing components. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 210 can also include memory 212 that stores computer executable components and instructions.

The device identification component 200 can receive data from various databases and/or network devices. The aggregation component 202 can take this data (e.g., TAC, IMEI, etc.) and combine it according to an analysis that the analysis component 204 has performed. For example, the analysis component 204 can analyze the location data associated with certain IOT devices and determine that the IOT devices are not mobile. Thus, the aggregation component 202 can combine this subset of IOT devices into a classification that is indicative of the IOT device's immobility status. It should be noted that the aggregation component 202 can aggregate devices prior to and after the analysis component 204 has performed an analysis. For example, a first aggregation can occur based on a TAC and/or IMEI number and prior to a second aggregation based on a more dynamic factor such as mobility, connectivity history, abnormality history, etc. The comparison component 206 can compare any new IOT devices to a pool of aggregated devices that have already been pooled together. For example, if a request for an identity of a new IOT device is received by the device identification component 200, the comparison component 206 can determine if there is any mobility status information associated with the new IOT device. If the mobility status indicates that the IOT device is a mobile IOT device, then the new IOT device cannot be pooled with the immobile IOT devices. Therefore, the new IOT device can be pooled with other IOT devices that are mobile.

Based on the comparison data, the analysis component 204 can determine a confidence level associated with the likelihood that the new IOT device does or does not belong to the group of immobile IOT devices. As additional data becomes available about the grouped IOT devices and/or new data about additional IOT devices, the confidence can begin to change (e.g., increase or decrease) as a function of time and/or new IOT device data. However, it should be noted that the mobility status of the IOT devices may only be one factor in the determination in the type of IOT device identity. Multiple factors are capable of being used to assist in the determination of an IOT device identity. Other factors such as frequency of connection to the network, location, signal strength, switch identification for a session, cell identification for a session, duration of connection, abnormalities in behavior, etc. can be used to assist in the determination of the IOT device identification. The artificial intelligence component 208 can take some or all of the aforementioned factors and perform the aforementioned functions automatically via machine learning procedures previously discussed.

Figure 3:
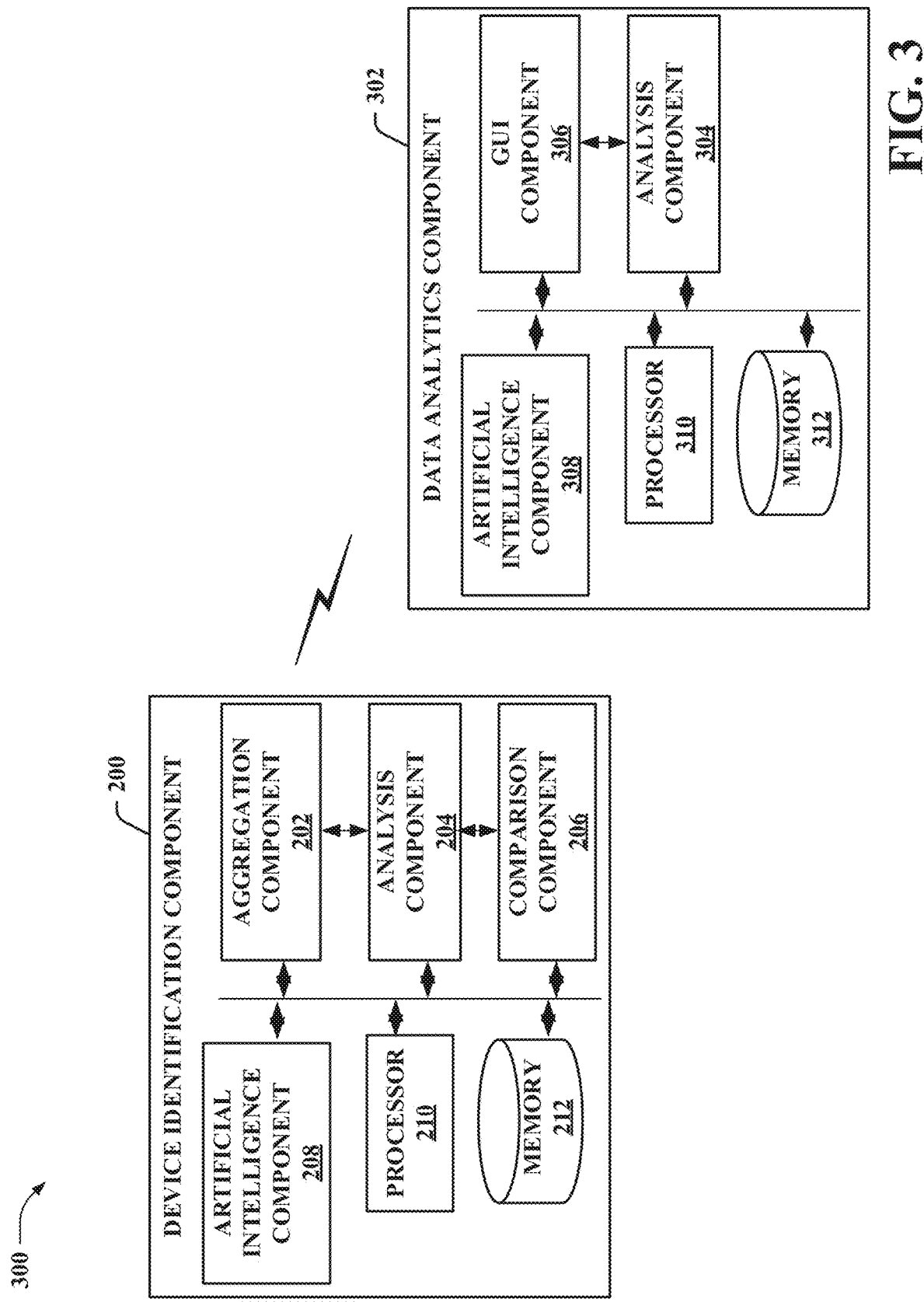
FIG. 3 illustrates an example schematic system block diagram of a IOT device identification system according to one or more embodiments.

Referring now to FIG. 3, illustrated is an example schematic system block diagram of a IOT device identification system 300. In an alternative embodiment, the device identification system 300 can comprise the device identification component 200 and a data analytics component 302. The data analytics component 302 can comprise a graphical user interface (GUI) component 306, an analysis component 304, an artificial intelligence component 308, a processor 310, and a memory 312, which can all be communicatively coupled. The processor 310 can correspond to a processing component from a plurality of processing components. Aspects of the processor 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processor 310 can also include memory 312 that stores computer executable components and instructions.

The data analytics component 302 can be an extension of or completely separate to the analysis component 204. For example, where the analysis component 204 might have a difficult time identifying an IOT device, the data analytics component can be privy to additional identification data received from other databases. Thus, the additional identification data can be used to help inform the analysis components 204 identification procedure. The additional data can be stored at the data analytics component 302 and received and/or displayed by the GUI component 306. The analysis component 304 can then perform an analysis with regards to the identification of IOT devices that is has in its database. It should be noted that the data analytics component 302 can be remotely located from the device identification component 200 and have access to separate databases that the device identification component 200 may or may not be privy to. However, either of the components can be used to inform the other component. It should also be noted that at times, one or more of the components depicted within the device identification component 200 can be wholly located at the data analytics component 302, and thus separate from the device identification component 200. In such a case, the functionality of such component can be performed at the data analytics component 302 when request by the device identification component 200.

Figure 4:
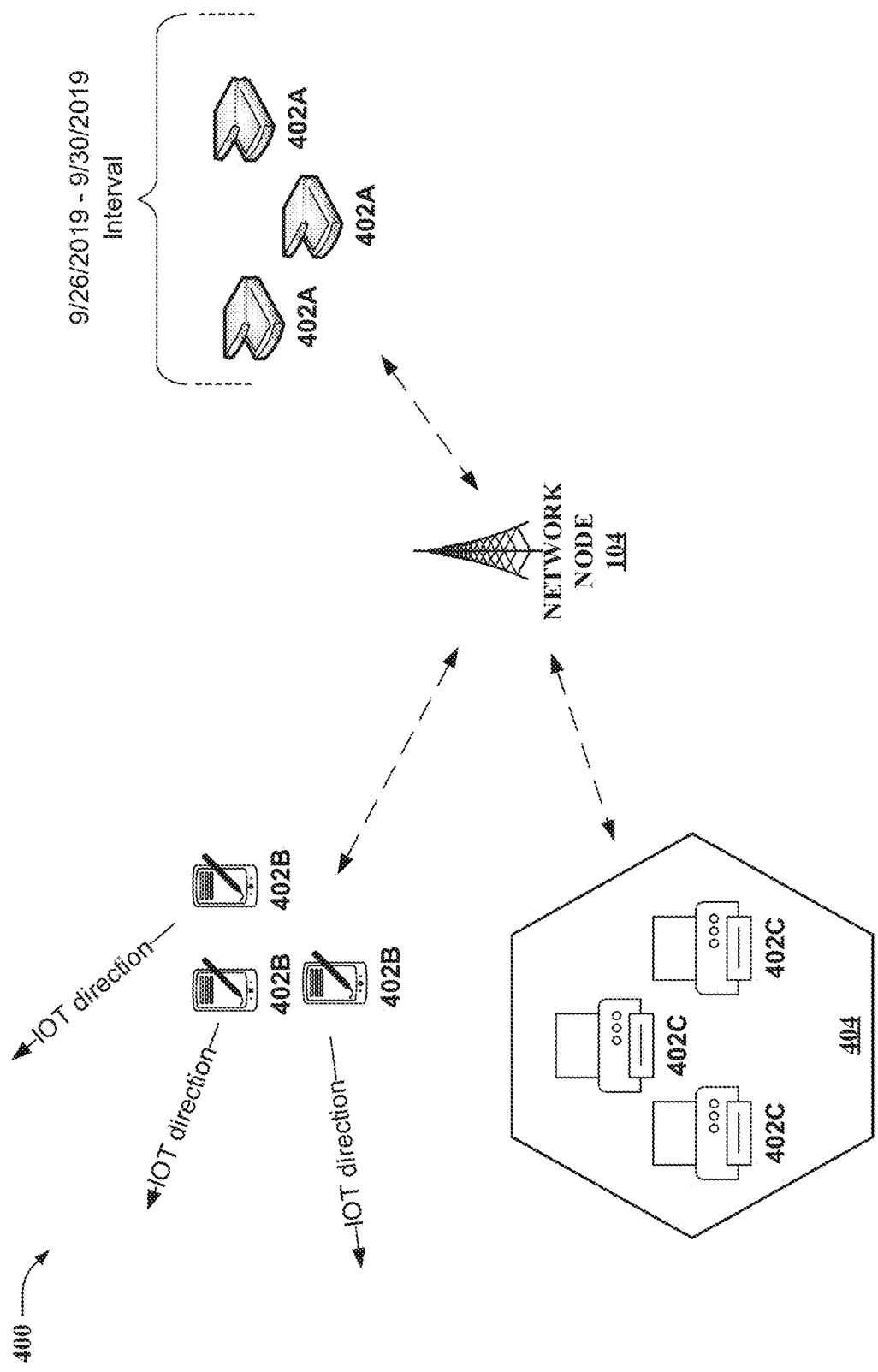
FIG. 4 illustrates an example schematic system block diagram of IOT device identification according to one or more embodiments.

Referring now to FIG. 4, illustrates an example schematic system block diagram of IOT device identification. The device identification component 200 and/or the data analytics component 302 can be hosted at the network node 104 or remote from the network node 104. However, it is important to note that certain behaviors can inform the device identification component 200 as to how to group specific IOT devices. For example, the IOT devices 402C can be grouped by the aggregation component 202 based on their behavioral patterns associated with a geographic area 404. Thus, if the analysis component 204 determines that the IOT device 402C type is generally located within the geographic area 404, then the comparison component 206 can compare the location of any new (e.g., device identity unknown or not currently listed in the database) IOT devices to the geographic area 404 to determine if the new IOT device should be grouped with the IOT devices 402C. For example, a confidence level, associated with an unknown IOT device identity, can increase the closer the unknown IOT device gets to the geographic area 404 and/or the confidence level can decrease the farther away the unknown devices moves from the geographic area 404.

With regards to IOT devices 402B, as depicted, the IOT devices 402B can be grouped based upon a direction of travel. For example, if it is known that a particular type of IOT device travels a specific route, path, trajectory, etc., the comparison component can compare other device routes, paths, trajectories, etc. to determine if a new IOT device should be grouped with the IOT devices 402B. Alternatively, and/or in additional to, IOT devices 402A can be grouped based time intervals of network connectivity, frequency of connectivity, length of connectivity, etc. As with IOT devices 402C, 402B, 402A, the closer a new device is in alignment with the grouping factors of a previously grouped IOT device, then the higher the confidence level. Alternatively, the once the new device info indicates that it is deviating from the aforementioned factors, then the confidence level can decrease. It should also be noted that any of these factors can be used concurrently to group and identify devices. For example, geographic location, route direction, and intervals of connectivity, can all be used concurrently to determine the identity of an IOT device that should be grouped with other IOT devices that meet the parameters of the above factors.

Figure 5:
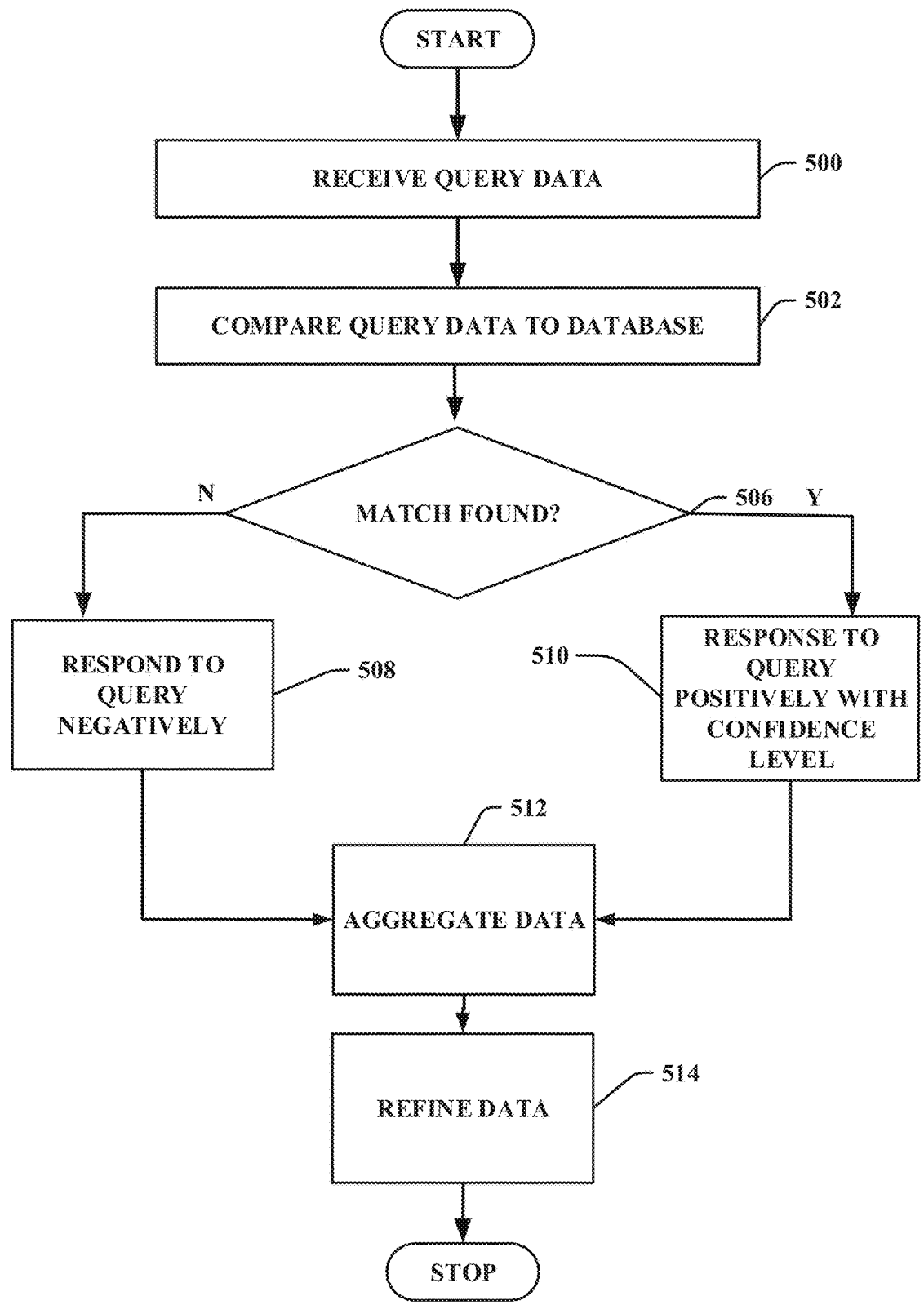
FIG. 5 illustrates an example schematic flow diagram of IOT device identification according to one or more embodiments.

Referring now to FIG. 5 illustrates an example schematic flow diagram of IOT device identification. Upon receiving a query for an identity of an unknown device at block 500, the device identification component 200 can compare any data from an unknown IOT device to that of known IOT devices, at block 502, via the comparison component 206. If a match in behaviors and/or data associated with unknown IOT device matches that of known IOT devices at block 506, then the device identification component 200 can send a response to the query indicating a grouping for the unknown device and a confidence level associated the grouping at block 510. For example, the response can indicate that there is a 90% likelihood that the unknown device is a home thermostat device. After this analysis is performed by the analysis component 204, the aggregation component 202 can add the unknown device to a pool of now known thermostat devices at block 512. There can also be sub-confidence device pooling such that the new thermostat device is also pooled as a function of confidence. For instance, the new thermostat device is pool with thermostat devices between 80%-100% confidence levels. Additionally, as new data points are added, deleted, and/or modified, the data can be refined at block 514 by the artificial intelligence component 208. Alternatively, if there is no match found, then the device identification component 200 can respond to the query negatively at block 508 and aggregate data that is not inclusive of the new IOT device at block 510 before refining the data to not include the new IOT device at block 514.

Figure 6:
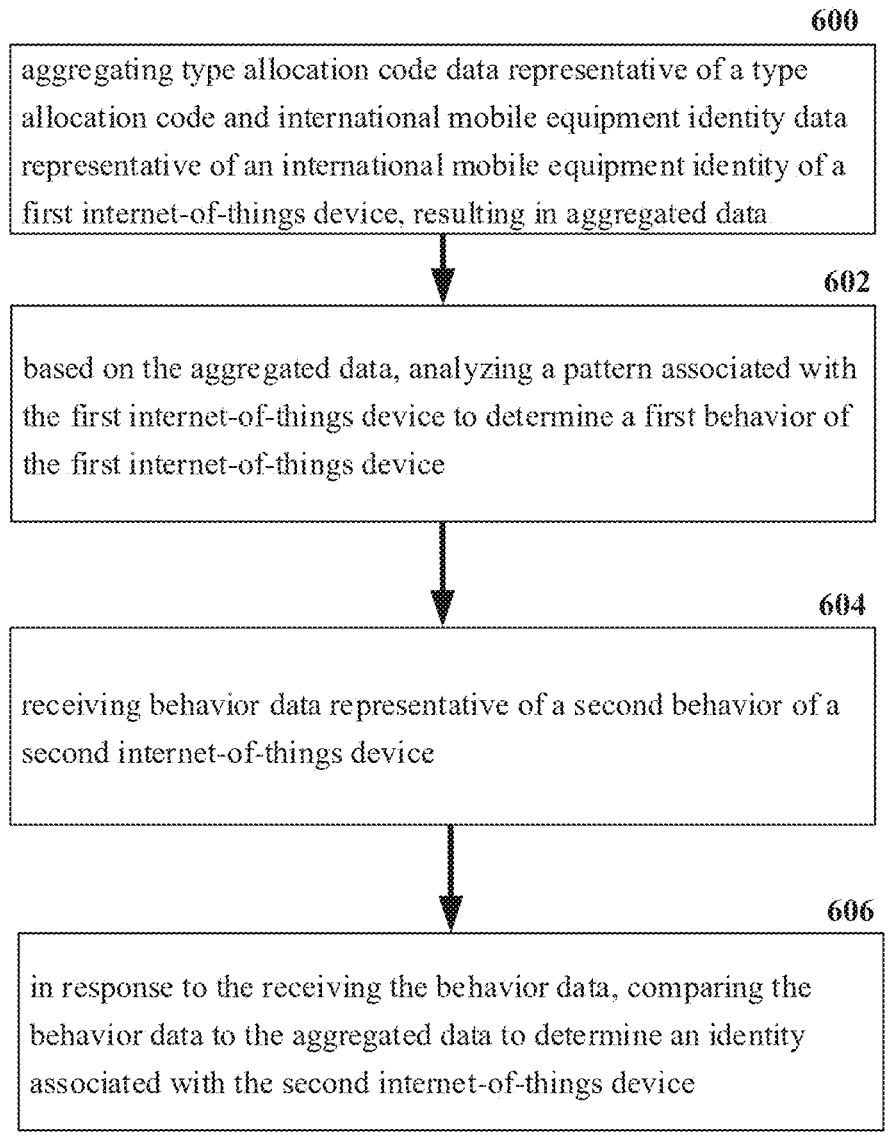
FIG. 6 illustrates an example flow diagram for a method for identifying IOT devices for a 5G network according to one or more embodiments.

Referring now to FIG. 6, illustrated is an example flow diagram for a method for identifying IOT devices for a 5G network according to one or more embodiments. At element 600, the method can comprise aggregating (e.g., via the aggregation component 202) type allocation code data representative of a type allocation code and international mobile equipment identity data representative of an international mobile equipment identity of a first internet-of-things device, resulting in aggregated data. Based on the aggregated data, at element 602, the method can comprise analyzing (e.g., via the analysis component 204), a pattern associated with the first internet-of-things device to determine a first behavior of the first internet-of-things device. Additionally, at element 604, the method can comprise receiving behavior data representative of a second behavior of a second internet-of-things device. In response to the receiving the behavior data, at element 606, the method can comprise comparing (e.g., via the comparison component 206) the behavior data to the aggregated data to determine an identity associated with the second internet-of-things device.

Figure 7:
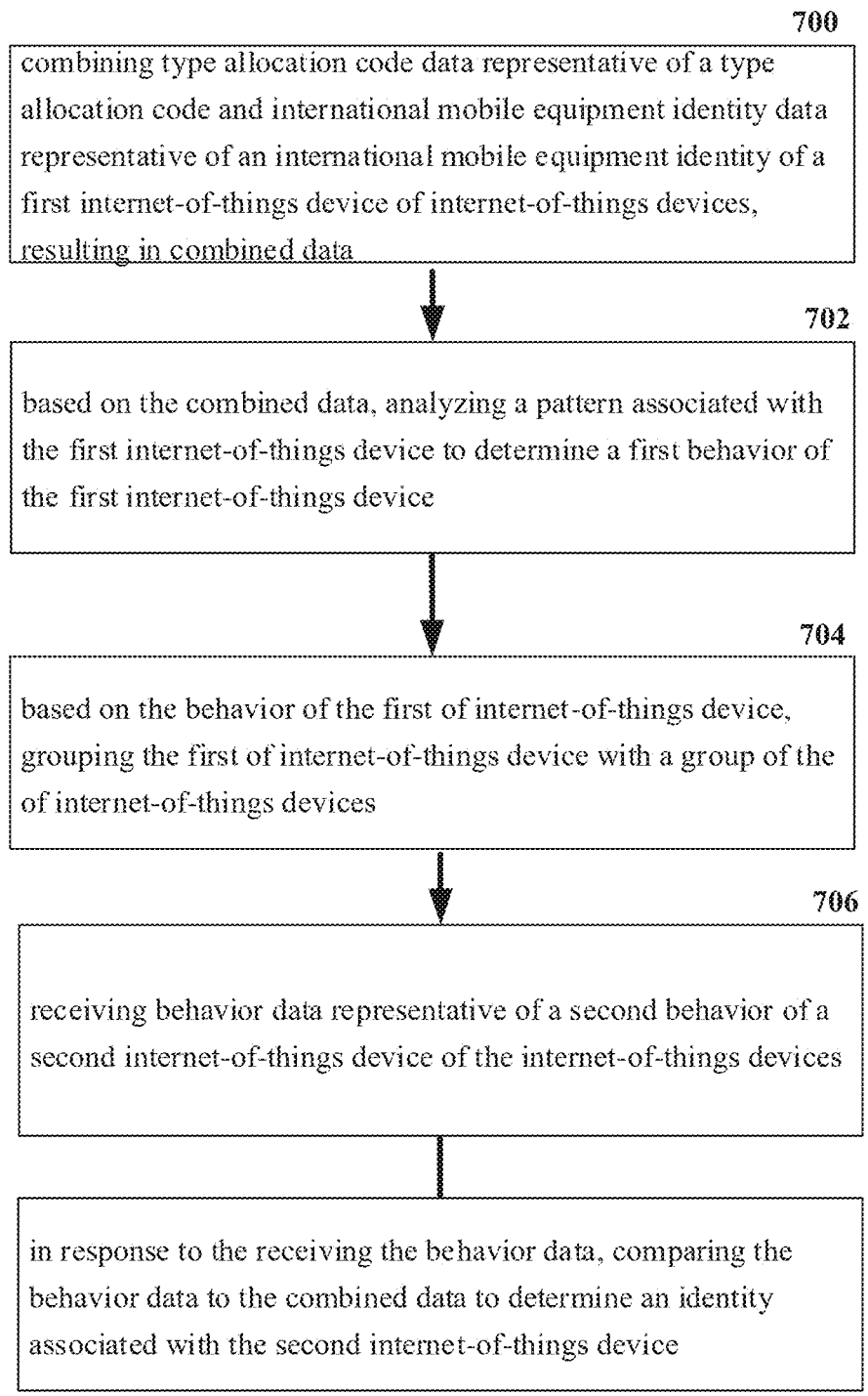
FIG. 7 illustrates an example flow diagram for a system for identifying IOT devices for a 5G network according to one or more embodiments.

Referring now to FIG. 7, illustrated is an example flow diagram for a system for identifying IOT devices for a 5G network according to one or more embodiments. At element 700, the system can facilitate combining (e.g., via the aggregation component 202) type allocation code data representative of type allocation code and international mobile equipment identity data representative of an international mobile equipment identity of a first internet-of-things device of internet-of-things devices, resulting in combined data. Based on the combined data, at element 702, the system can facilitate analyzing (e.g., via the analysis component 204) a pattern associated with the first internet-of-things device to determine a first behavior of the first internet-of-things device. Additionally, based on the behavior of the first of internet-of-things device, the system operations can comprise grouping (e.g., via the aggregation component 202) the first of internet-of-things device with a group of the of internet-of-things devices at element 704. At element 706, the system operations can comprise receiving behavior data representative of a second behavior of a second internet-of-things device of the internet-of-things devices. Furthermore, in response to the receiving the behavior data, the system operations can comprise comparing (e.g., via the comparison component 206) the behavior data to the combined data to determine an identity associated with the second internet-of-things device at element 708.

Figure 8:
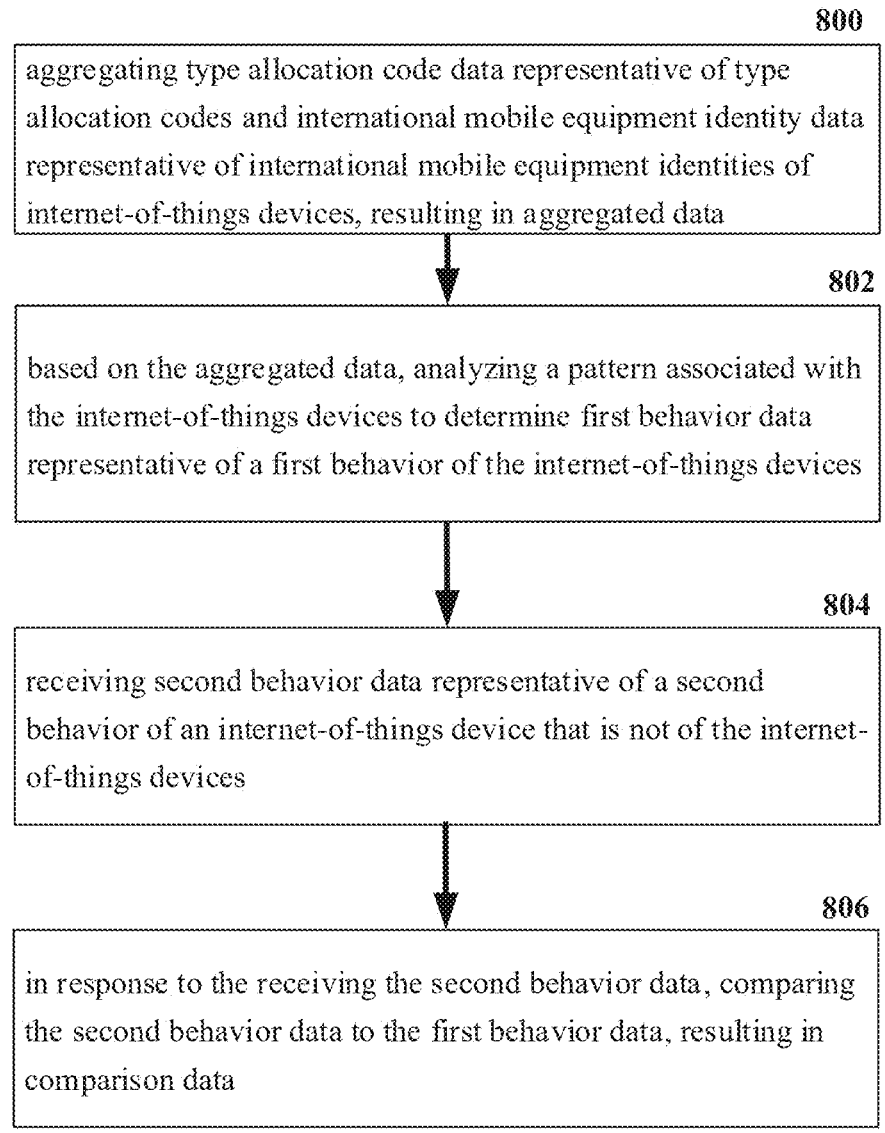
FIG. 8 illustrates an example flow diagram for a machine-readable medium for identifying IOT devices for a 5G network according to one or more embodiments.

Referring now to FIG. 8, illustrated is an example flow diagram for a machine-readable medium for identifying IOT devices for a 5G network according to one or more embodiments. At element 800, the machine-readable storage medium can perform the operations comprising aggregating (e.g., via the aggregation component 202) type allocation code data representative of type allocation codes and international mobile equipment identity data representative of international mobile equipment identities of internet-of-things devices, resulting in aggregated data. Based on the aggregated data, at element 802, the machine-readable storage medium can perform the operations comprising analyzing (e.g., via the analysis component 204) a pattern associated with the internet-of-things devices to determine first behavior data representative of a first behavior of the internet-of-things devices. Additionally, at element 804, the machine-readable storage medium can perform the operations comprising receiving second behavior data representative of a second behavior of an internet-of-things device that is not of the internet-of-things device. In response to the receiving the second behavior data, the machine-readable storage medium can perform the operations comprising comparing (e.g., via the comparison component 206) the second behavior data to the first behavior data, resulting in comparison data at element 806.

Figure 9:
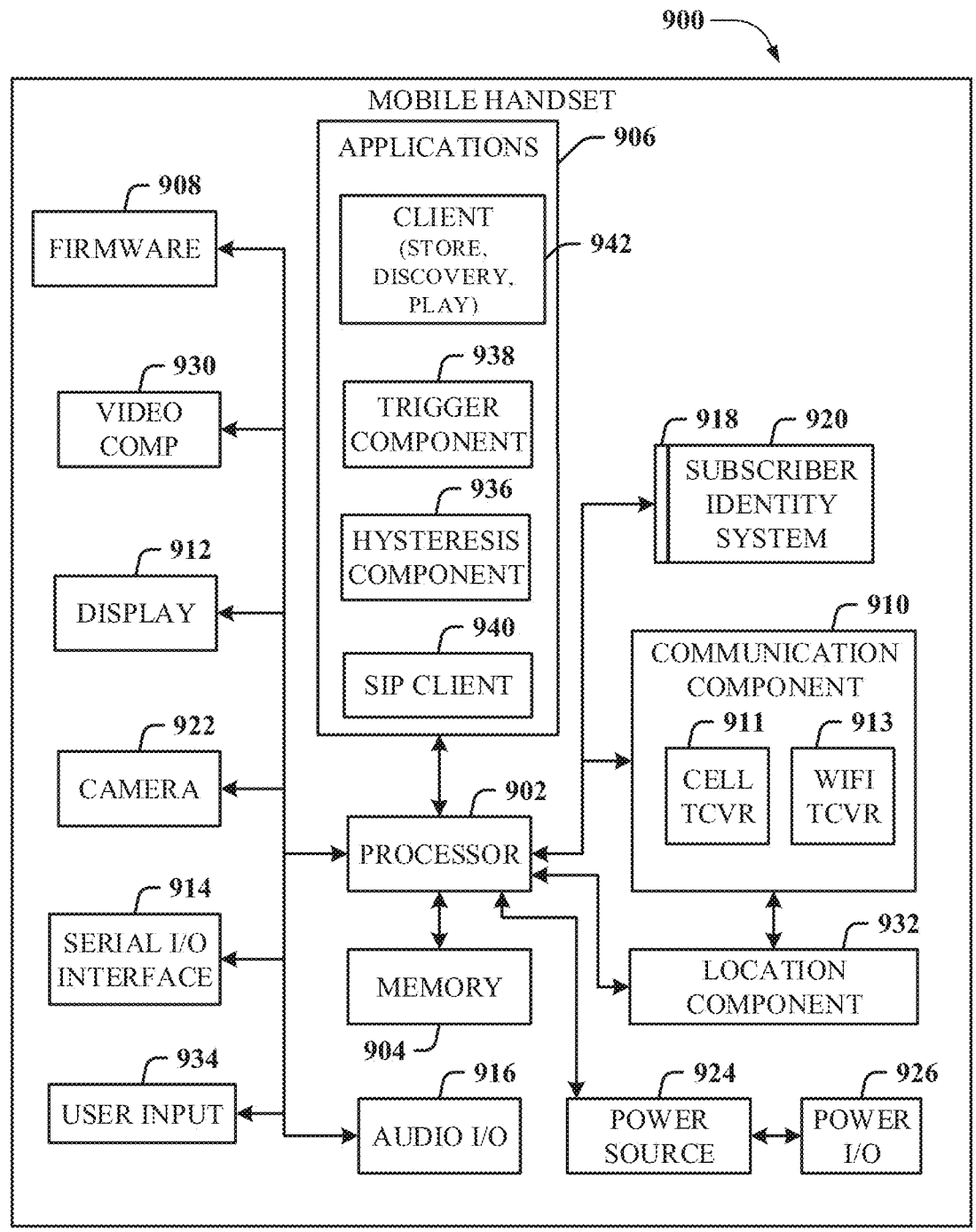
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
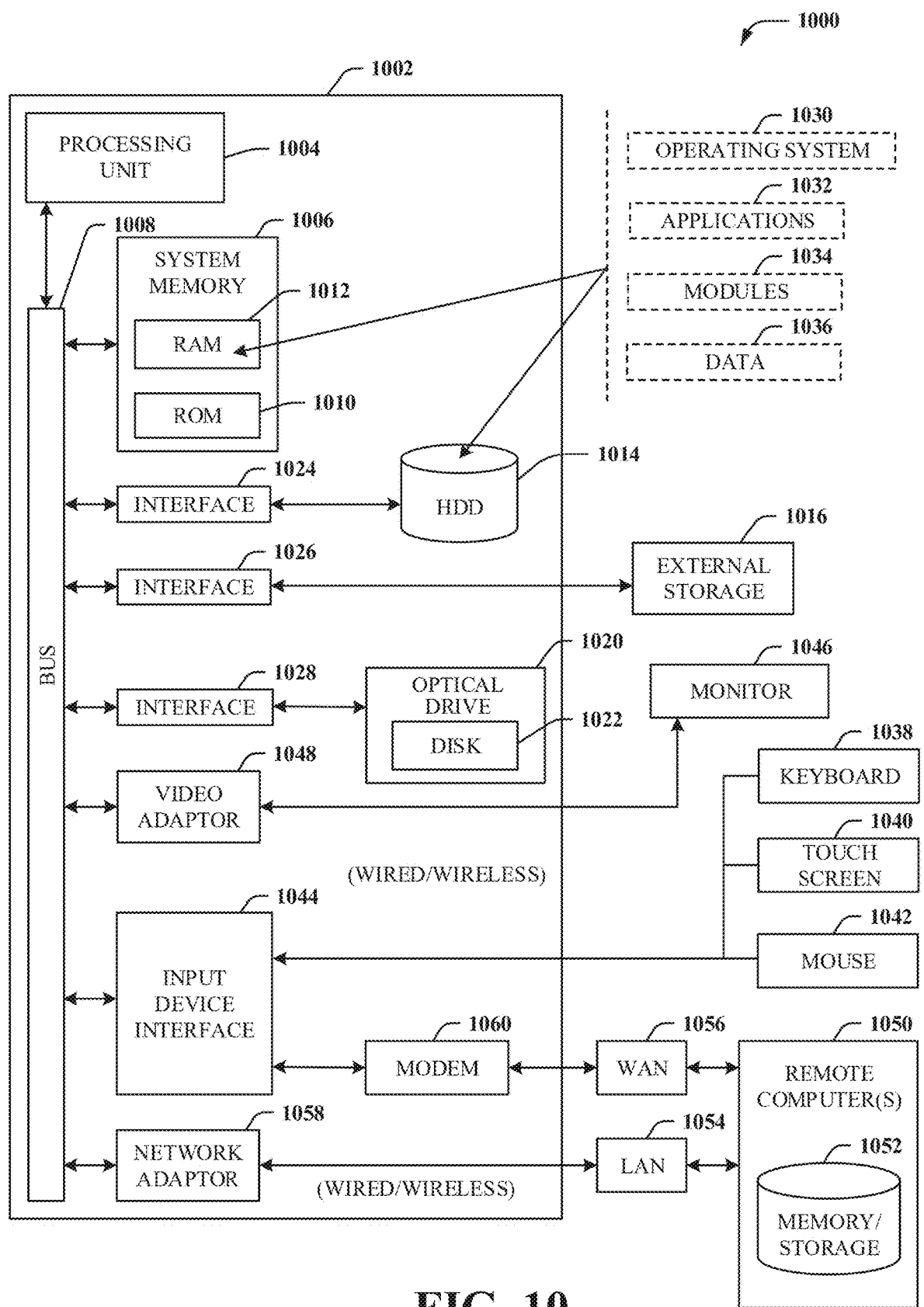
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056 and/or a low-power WAN. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
aggregating, by a wireless network device comprising a processor, type allocation code data representative of a type allocation code and international mobile equipment identity data representative of an international mobile equipment identity of a first internet-of-things device, resulting in aggregated data;
based on the aggregated data, analyzing, by the wireless network device, a pattern associated with the first internet-of-things device to determine a first behavior of the first internet-of-things device;
receiving, by the wireless network device, behavior data representative of a second behavior of a second internet-of-things device; and
in response to the receiving the behavior data, comparing, by the wireless network device, the behavior data to the aggregated data to determine an identity associated with the second internet-of-things device.

2. The method of claim 1, further comprising:
based on the comparing, generating, by the wireless network device, comparison data representative of a comparison between the first internet-of-things device and the second internet-of-things device.

3. The method of claim 2, further comprising:
in response to the generating the comparison data, generating, by the wireless network device, type data representative of a type of internet-of-things device.

4. The method of claim 3, further comprising:
based on the generating the type data, labeling, by the wireless network device, the second internet-of-things device as the type of internet-of-things device.

5. The method of claim 4, further comprising:
based on the labeling as the type of the internet-of-things device, assigning, by the wireless network device, a probability value to the second internet-of-things device.

6. The method of claim 5, further comprising:
receiving, by the wireless network device from a requesting device, request data representative of a request for the type of internet-of-things device associated with the second internet-of-things device.

7. The method of claim 6, further comprising:
in response to the receiving the request data, sending, by the wireless network device to the requesting device, the type of the internet-of-things device associated with the second internet-of-things device.

8. A system, comprising:
a processor; and
a memory that stores executable instructions that, when executed by the processor, facilitate performance of operations, comprising:
combining type allocation code data representative of a type allocation code and international mobile equipment identity data representative of an international mobile equipment identity of a first internet-of-things device of internet-of-things devices, resulting in combined data;
based on the combined data, analyzing a pattern associated with the first internet-of-things device to determine a first behavior of the first internet-of-things device;
based on the behavior of the first of internet-of-things device, grouping the first of internet-of-things device with a group of the of internet-of-things devices;
receiving behavior data representative of a second behavior of a second internet-of-things device of the internet-of-things devices; and
in response to the receiving the behavior data, comparing the behavior data to the combined data to determine an identity associated with the second internet-of-things device.

9. The system of claim 8, wherein the operations further comprise:
in response to the comparing the behavior data, determining the identity of the second of internet-of-things device.

10. The system of claim 9, wherein the operations further comprise:
in response to the determining the identity, grouping the second internet-of-things device with the group of the of internet-of-things devices.

11. The system of claim 9, wherein the operations further comprise:
in response to the determining the identity, determining that the second of internet-of-things device does not belong to the group of the of internet-of-things devices.

12. The system of claim 11, wherein the operations further comprise:
in response to the determining that the second internet-of-things device does not belong to the group of the of internet-of-things devices, generating confidence data representative of a confidence that the second internet-of-things device does not belong to the group of internet-of-things devices.

13. The system of claim 12, wherein the operations further comprise:
in response to a request data representative of a request from a mobile device for the identity of the second internet-of-things device, transmitting the confidence data to the mobile device.

14. The system of claim 8, wherein the second behavior data is associated with an ability of the second internet-of-things device to connect to a wireless network.

15. A non-transitory machine-readable medium, comprising executable instructions that, when executed by a processor, facilitate performance of operations, comprising:
aggregating type allocation code data representative of type allocation codes and international mobile equipment identity data representative of international mobile equipment identities of internet-of-things devices, resulting in aggregated data;
based on the aggregated data, analyzing a pattern associated with the internet-of-things devices to determine first behavior data representative of a first behavior of the internet-of-things devices;
receiving second behavior data representative of a second behavior of an internet-of-things device that is not of the internet-of-things devices; and
in response to the receiving the second behavior data, comparing the second behavior data to the first behavior data, resulting in comparison data.

16. The non-transitory machine-readable medium of claim 15, wherein the operations further comprise:
based on the comparison data, determining that the internet-of-things device is to be grouped with the internet-of-things devices.

17. The non-transitory machine-readable medium of claim 16, wherein the operations further comprise:
in response to the determining that the internet-of-things device is to be grouped with the internet-of-things devices, generating probability data representative of a probability that the internet-of-things device is to be grouped with the internet-of-things devices.

18. The non-transitory machine-readable medium of claim 17, wherein the probability data is a function of time.

19. The non-transitory machine-readable medium of claim 17, wherein the probability increases as a function of an increase of the aggregated data.

20. The non-transitory machine-readable medium of claim 17, wherein the probability decreases as a function of an increase of the aggregated data.

* * * * *